US012621530B2

(12) United States Patent
McCarty et al.

(10) Patent No.: US 12,621,530 B2
(45) Date of Patent: *May 5, 2026

(54) AUGMENTED DISPLAY FROM CONVERSATIONAL MONITORING

(71) Applicant: Adeia Guides Inc., San Jose, CA (US)

(72) Inventors: Michael K. McCarty, Agoura Hills, CA (US); Glen E. Roe, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,115

(22) Filed: Oct. 9, 2024

(65) Prior Publication Data

US 2025/0039507 A1     Jan. 30, 2025

Related U.S. Application Data

(63) Continuation of application No. 18/225,983, filed on Jul. 25, 2023, now Pat. No. 12,143,673, which is a continuation of application No. 17/681,059, filed on Feb. 25, 2022, now Pat. No. 11,758,230, which is a continuation of application No. 17/042,322, filed as
(Continued)

(51) Int. Cl.
| | |
|---|---|
| *H04N 21/466* | (2011.01) |
| *G10L 15/22* | (2006.01) |
| *H04N 21/422* | (2011.01) |
| *H04N 21/435* | (2011.01) |
| *H04N 21/442* | (2011.01) |
| *H04N 21/45* | (2011.01) |
| *H04N 21/4788* | (2011.01) |
(Continued)

(52) U.S. Cl.
CPC ......... *H04N 21/4668* (2013.01); *G10L 15/22* (2013.01); *H04N 21/42203* (2013.01); *H04N 21/435* (2013.01); *H04N 21/44213* (2013.01); *H04N 21/4532* (2013.01); *H04N 21/4788* (2013.01); *H04N 21/4828* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 9,092,415 | B2 * | 7/2015 | Fife ........................ | G06F 40/205 |
| 11,297,390 | B2 * | 4/2022 | McCarty .......... | H04N 21/44213 |

(Continued)

*Primary Examiner* — Alexander Q Huerta
(74) *Attorney, Agent, or Firm* — HG LAW LLP

(57) ABSTRACT

Systems and methods are provided for generating for display an indication of a segment of media content relevant to a voice communication. This may be accomplished by a media guidance application that monitors a voice communication between users. The media guidance application determines that a first user is describing media content. In response to determining that the first user is describing the media content, the media guidance application retrieves media asset viewing history of the first user. The media guidance application determines, based on metadata of each media asset in the media asset viewing history of the first user and the voice communication, a media asset that the first user is describing. The media guidance application determines, based on metadata of the media asset, a segment of the media asset that the first user is describing. The media guidance application generates, for display, an indication of the segment.

20 Claims, 8 Drawing Sheets

Related U.S. Application Data application No. PCT/US2018/039436 on Jun. 26, 2018, now Pat. No. 11,297,390.

(51) Int. Cl.

| | | |
|---|---|---|
| *H04N 21/482* | (2011.01) | |
| *H04N 21/845* | (2011.01) | |

(56) References Cited

U.S. PATENT DOCUMENTS

| | | | | |
|---|---|---|---|---|
| 11,620,327 B2 * | 4/2023 | Raichelgauz | ....... | G06F 16/4393 |
| | | | | 707/E17.046 |
| 11,758,230 B2 * | 9/2023 | McCarty | ............... | H04L 51/046 |
| | | | | 725/9 |
| 12,143,673 B2 * | 11/2024 | McCarty | ................. | H04L 51/02 |
| 2008/0235018 A1 * | 9/2008 | Eggen | .................... | G10L 15/26 |
| | | | | 704/E15.045 |
| 2013/0159003 A1 * | 6/2013 | Kim | ........................ | G10L 25/54 |
| | | | | 704/E21.001 |
| 2013/0297317 A1 * | 11/2013 | Lee | ......................... | G10L 17/00 |
| | | | | 704/270.1 |
| 2016/0227283 A1 * | 8/2016 | Kelly | ................. | H04N 21/4532 |
| 2019/0166403 A1 * | 5/2019 | Yelton | .................... | G10L 15/08 |
| 2019/0297167 A1 * | 9/2019 | Foerster | ............... | H04L 65/612 |
| 2020/0250236 A1 * | 8/2020 | Blake | ................. | G06F 16/3334 |

* cited by examiner

200

300

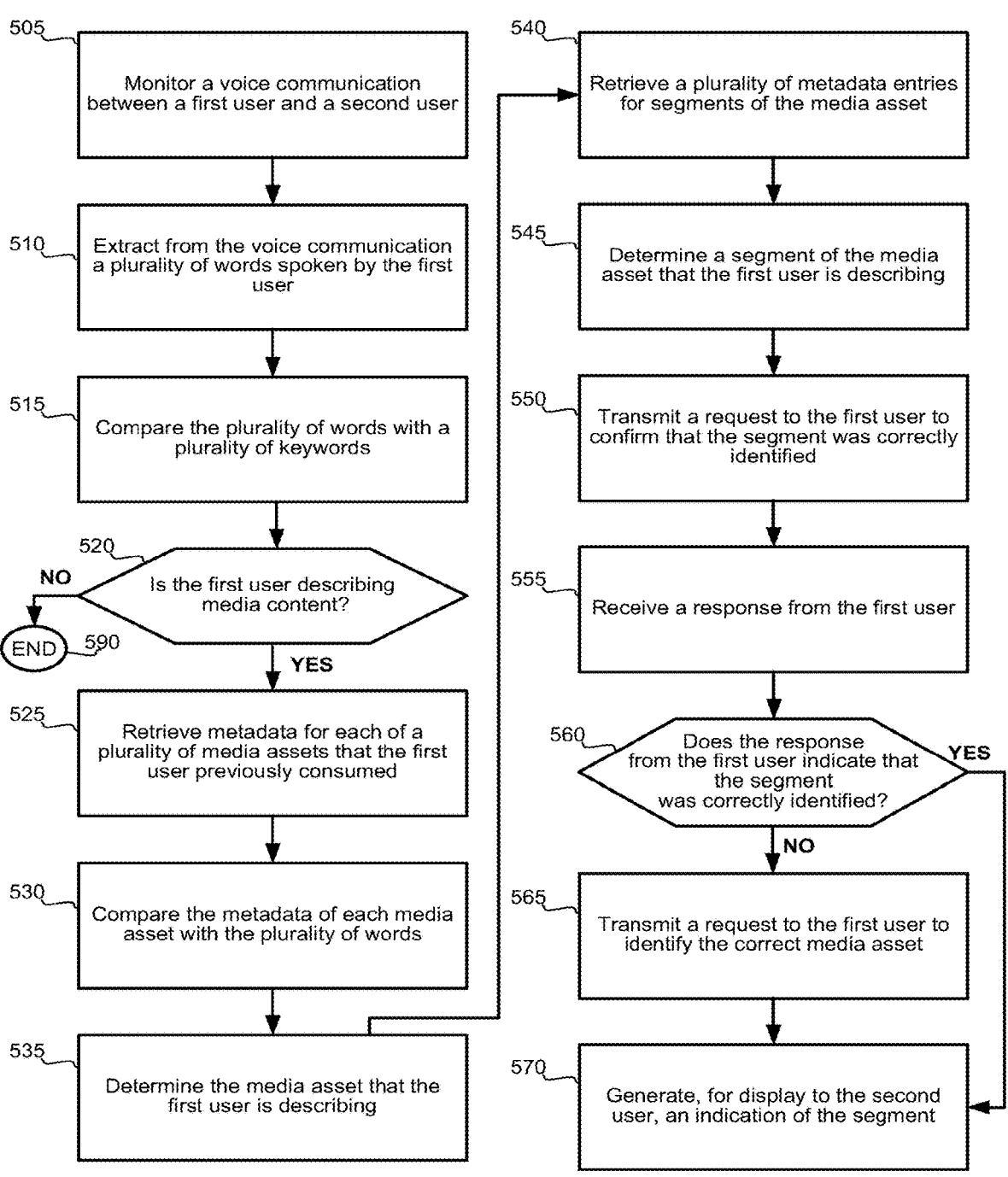

505

Monitor a voice communication between a first user and a second user

510

Extract from the voice communication a plurality of words spoken by the first user

515

Compare the plurality of words with a plurality of keywords

520

NO ← Is the first user describing media content?

END 590

YES

525

Retrieve metadata for each of a plurality of media assets that the first user previously consumed

530

Compare the metadata of each media asset with the plurality of words

535

Determine the media asset that the first user is describing

540

Retrieve a plurality of metadata entries for segments of the media asset

545

Determine a segment of the media asset that the first user is describing

550

Transmit a request to the first user to confirm that the segment was correctly identified

555

Receive a response from the first user

560

Does the response from the first user indicate that the segment was correctly identified? YES

NO

565

Transmit a request to the first user to identify the correct media asset

570

Generate, for display to the second user, an indication of the segment

FIG 5

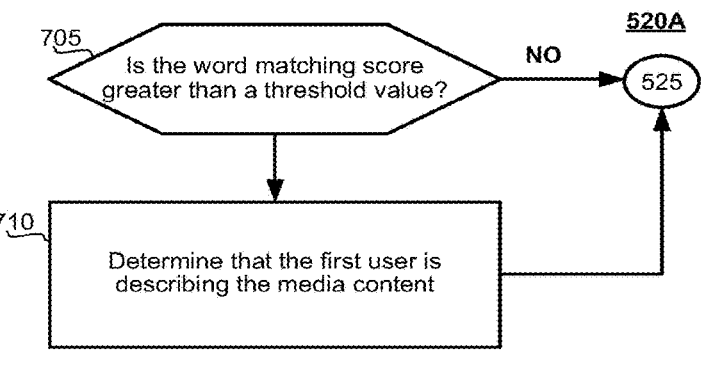

705 Is the word matching score greater than a threshold value? NO 520A 525

710 Determine that the first user is describing the media content

FIG 7

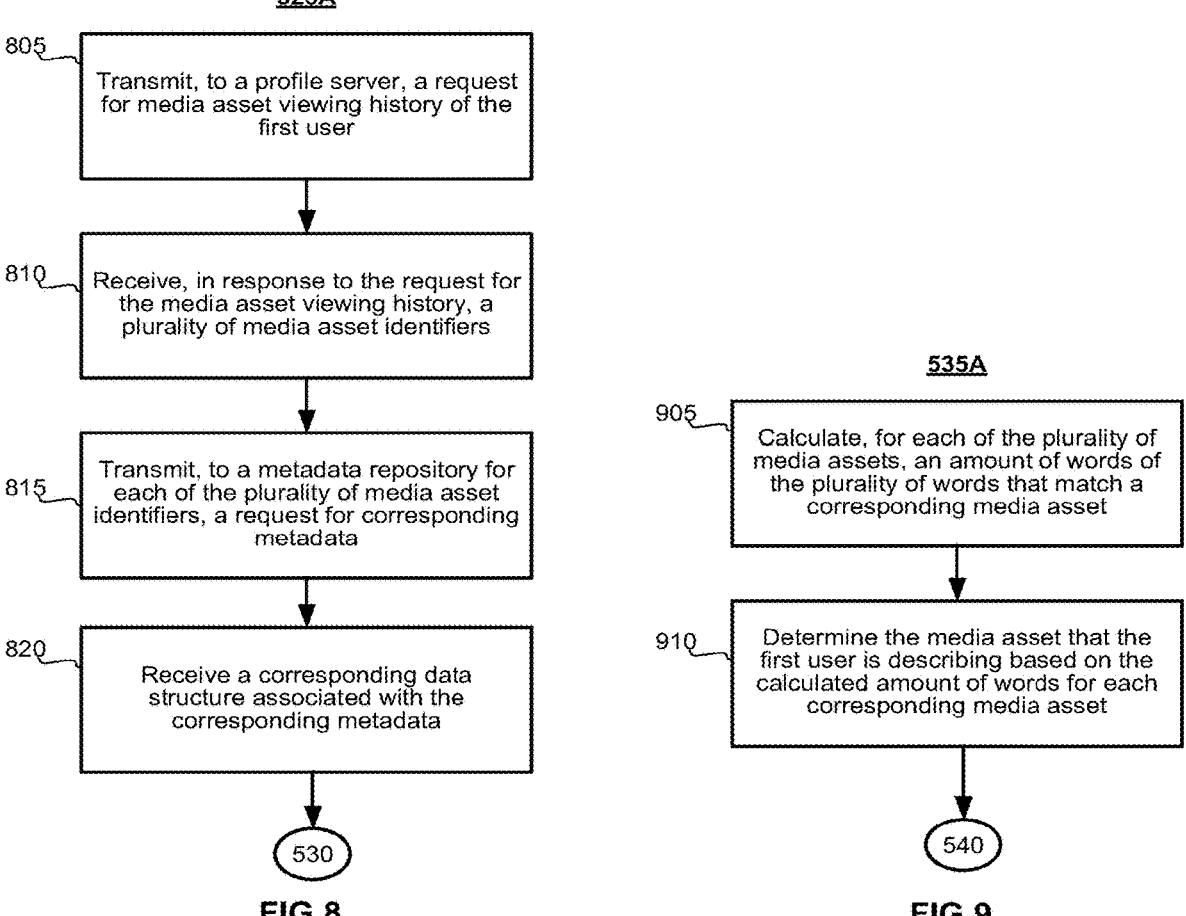

525A

805 Transmit, to a profile server, a request for media asset viewing history of the first user 810 Receive, in response to the request for the media asset viewing history, a plurality of media asset identifiers 815 Transmit, to a metadata repository for each of the plurality of media asset identifiers, a request for corresponding metadata 820 Receive a corresponding data structure associated with the corresponding metadata

905 Calculate, for each of the plurality of media assets, an amount of words of the plurality of words that match a corresponding media asset 910 Determine the media asset that the first user is describing based on the calculated amount of words for each corresponding media asset

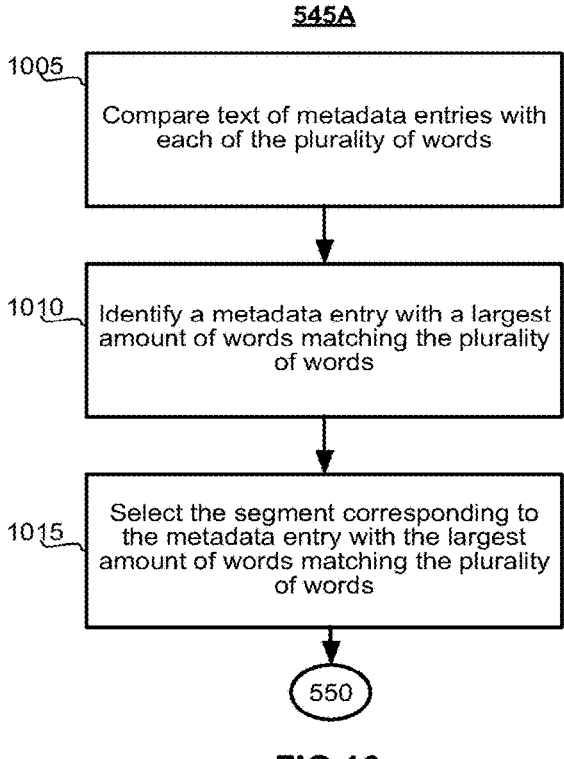

545A

1005 — Compare text of metadata entries with each of the plurality of words

1010 — Identify a metadata entry with a largest amount of words matching the plurality of words 1015 — Select the segment corresponding to the metadata entry with the largest amount of words matching the plurality of words

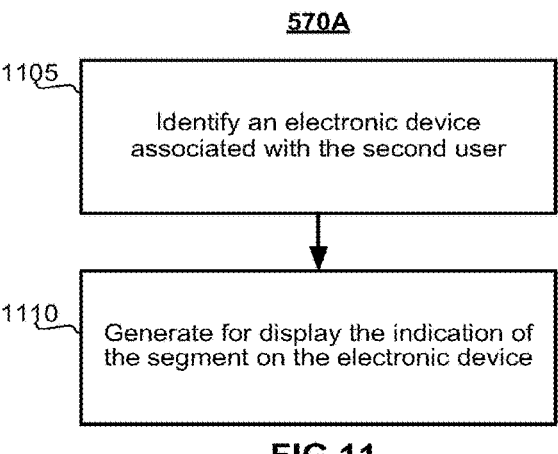

570A

1105 — Identify an electronic device associated with the second user

1110 — Generate for display the indication of the segment on the electronic device

FIG 11

AUGMENTED DISPLAY FROM CONVERSATIONAL MONITORING

CROSS-REFERENCE TO RELATED APPLICATIONS

This application is a continuation of U.S. patent application Ser. No. 18/225,983, filed Jul. 25, 2023, which is a continuation of U.S. patent application Ser. No. 17/681,059, filed Feb. 25, 2022, (now U.S. Pat. No. 11,758,230), which is a continuation of U.S. patent application Ser. No. 17/042, 322, filed Sep. 28, 2020 (now U.S. Pat. No. 11,297,390), which is national a stage application under 35 U.S.C. § 371 of International Application No. PCT/US2018/039436, filed Jun. 26, 2018, the disclosures of each application are incorporated by reference herein in their entireties.

BACKGROUND

Viewers often want to discuss exciting and interesting media content with friends and colleagues. Viewers may have conversations in person or across the digital divide with friends and family, and may want to share a show, clip, episode, or highlight with another other person who has not seen the same content. Even if the other person has seen the same event, a viewer may want to talk through a highlight, or the other person may have watched a different presentation of the event or otherwise missed a segment of the media content the viewer is discussing. If a viewer is forced to use conventional interfaces to select a desired segment, the viewer may lose the moment and excitement leading to subpar experiences and interest in the conversation. Viewers, therefore, desire mechanisms for sharing media content, and particular segments of that content, with friends and colleagues during conversations related to that content.

SUMMARY

The integration of media into daily life has increased the ability for users to share experiences, particularly experiences related to the enjoyment of media consumption, with others, both in person and across distances. In particular, media systems may provide mechanisms for users to share links to media content, including segments of media content. For example, a user may select a hyperlink of a YouTube® video or even to a particular time segment in a YouTube® video. However, while media systems are able to display content when a recipient clicks a link, the systems still fail to overcome problems associated with sharing media content, such as: (i) the amount of media content can be overwhelming and it can be difficult to find a desired segment of content to share; (ii) interfaces to share media content can be confusing and difficult to use, especially when users are engaged in conversations and don't want to focus on controlling their user device.

Accordingly, to overcome the problems created when attempting to share media content with another party, methods and systems are described for generating for display an indication of a segment of media content relevant to a voice communication between two users. Specifically, a media guidance application renders visual indicators to a target user about segments that a source user is trying to discuss with the target user. While counter to the prevailing systems, which rely solely on the source user selecting specific time portions of a segment of a media asset, the media guidance application use a novel, hybrid approach that relies on keywords of a conversation in combination with the source user's viewing history to select the appropriate portion of a media asset to share with the target user.

For example, the media guidance application generates for display an indication of a segment of media content relevant to a voice communication between two users. The media guidance application does this by monitoring a voice communication between a first user (i.e., a source user) at a first communication device (e.g., a smartphone) and a second user (i.e., a target user) at a second communication device (e.g., a smartphone). For example, the first user may be discussing a recent sporting event (e.g., when the Washington Capitals won the 2018 Stanley Cup Championship) with a second user. The media guidance application may extract from the voice communication words spoken by the first user. For example, the source user may ask the target user, "Did you see Ovi lift the cup?" which is a reference to the Capitals' captain, Alexander Ovechkin, lifting the champion trophy. In this example, the second user may not have seen that event, and the first user may desire to share a particular segment of the event with the second user. By monitoring a conversation between two users, the media guidance application can locate the media asset of interest, e.g., a replay of the final game of the 2018 Stanley Cup Championship).

The media guidance application may compare words from the users' conversation with keywords that indicate that media content is being described. For example, the media guidance application may extract the words "did you see" from the conversation which suggests that media content is being described. The media guidance application may be configured with other trigger words that indicate media content is being described. In some embodiments, the media guidance application may rely on trainable models that identify various conversation patterns indicating that users are discussing media content. In some embodiments, the media guidance application may retrieve pertinent keywords, trainable models, parameters, and/or speech patterns from a remote server and update a local data store with updated keywords, trainable models, parameters, and/or speech patterns. The media guidance application may also learn over time the specific speech patterns of a user that correlate with discussions of media content. For example, the media guidance application may ask the user to confirm that media content is being discussed, and if the user confirms that media content is being discussed, then the media guidance application may update the specific parameters used when interacting with that user. Those customized parameters may be stored in a remote server in conjunction with an identifier of the user. The media guidance application may, based on the comparison, determine that the first user is describing a media content. For example, the media guidance application may correlate the users' conversation with trigger words.

If the first user is describing media content, the media guidance application may respond by identifying a portion of the media content to share. The media guidance application may retrieve metadata for several media assets that the first user previously consumed. For example, the media guidance application may use the first user's viewing history to obtain media assets that were viewed in the past day, week, month, or year and pull metadata for those media assets that provide descriptive content. By using this information, the media guidance application may identify relevant media content without requiring the user interacting with complicated user menus across large media choices. In the example of the user having watched the final game of the Stanley Cup Finals, the media guidance application would retrieve metadata associated with that showing, for example, a list of words including: "NHL," "hockey", "Washington D.C.," "Las Vegas," "Stanley Cup," "Capitals," "Ovechkin," "Marc Andre-Fleury", "Golden Knights", "lift", etc. The media guidance application would retrieve metadata for each of the media assets in the user's viewing history being considered as a possible match. The media guidance application may compare the metadata of each media asset in the user's watch list to a plurality of words extracted from the conversation. In this case, "cup" has a correlation with "Stanley Cup" in the metadata from the first user's watch list. The first user's watch list may also contain entries for other media assets with metadata that correlate with words extracted from the conversation, e.g., a "World Cup Soccer" match and "Operating Vehicle Impaired ("OVI") Laws" summary video.

The media guidance application may determine, based on comparing the metadata of each media asset with the extracted words, a media asset that the first user is describing. For example, "lift," "Ovi," and "cup" may be found as weighted matches from the users' conversation with metadata about the final game of the 2018 Stanley Cup Finals. The media guidance application may also retrieve metadata entries corresponding to different segments of the matching media asset. For example, a portion of the media asset marked from 3:48:05 to 3:52:02 may have associated metadata marking the segment as "Alexander Ovechkin lifts the Stanley Cup." The media guidance application may determine a segment of the media asset that the first user is describing based on the associated metadata. For example, the media guidance application may match "lift," "Ovi," and "cup" with the metadata of the segment. The media guidance application may generate, for display to the second user, an indication of the segment. For example, the media guidance application may present a link to the second user to watch a particular segment of the identified media asset.

In some embodiments, the media guidance application may compare the words extracted from the users' conversation the according to the following. The media guidance application may select a first word from the conversation words. For example, the media guidance application may select "see" from the extracted words. The media guidance application may compare the selected word to each keyword. For example, the media guidance application may be configured to consider the word "see" to be a keyword suggesting that media content is being described. The media guidance application may determine, based on comparing the first word of the extracted words with each keyword of the keywords, whether the first word matches any of the plurality of keywords. In response to determining that the first word matches a keyword from the plurality of keywords, updating a word matching score. For example, the media guidance application may utilize a scoring metric, e.g., the word matching score, to track how many keywords are matched in the conversation, and/or what weight to give the matching words, to determine whether the user is discussing media content. This may comprise a simple count of extracted conversation words that match the trigger keywords or may comprise a more complex weighted value system.

In some embodiments, the media guidance application may retrieve a weight associated with the first keyword. For example, the media guidance application may determine that the word "did" has a relatively low weight, e.g., 0.01, the word "you" has an equally low weight, e.g., 0.01, and "see" has a relatively moderate weigh of 0.30. In some embodiments, the media guidance application may analyze the weight of phrases as well. For example, the media guidance application may consider "did you see" to have a moderately high rate of, e.g., 0.80. The media guidance application may update the word matching score with the weight associated with the first keyword.

In some embodiments, the media guidance application determines whether the word matching score is greater than a threshold value. For example, the media guidance application may determine that a score of less than 0.10 does not meet a threshold needed to consider the conversation is indicating the user is discussing media content. In response to determining that the word matching score is greater than the threshold value, the media guidance application determines that the first user is describing media content.

In some embodiments, the media guidance application retrieves metadata for each of the plurality of media assets that the first user previously consumed is achieved according to the following. The media guidance application may transmit, to a profile server, a request for a media asset viewing history of the first user. For example, the media guidance application may identify a user according to the user's name, login information (e.g., username and/or email address), account information, or other unique identifier. The media guidance application may contact a remote server, e.g., a web server, API host, database server, or other system with information requesting a user's viewing history. For example, the media guidance application may utilize a JSON (JavaScript Object Notation) request sent to a web application programming interface that specifies the information being sent, e.g., viewing history, and identifier of the user, e.g., the first user. In some embodiments, the media guidance application may also include a time period for which the information is sought, e.g., 24 hours. The media guidance application may receive, in response to the request for the media asset viewing history, a plurality of media asset identifiers, wherein each of the plurality of media asset identifiers identifies a media asset the first user has previously consumed. For example, the media guidance application may receive a JSON response with a list of titles, or unique IDs. The media guidance application may then transmit, to a metadata repository for each of the plurality of media asset identifiers, a request for metadata corresponding to the media assets. For example, the media guidance application may request, using a JSON API request, information describing each media asset in the user's history from a server that houses such information. In response to the request for the corresponding metadata, the media guidance application may receive a corresponding data structure associated with the corresponding metadata. For example, the media guidance application may receive list of arrays of strings, e.g., metadata, that describe the requested media assets in association, e.g., as key-value pairs, with identifiers for each media asset.

In some embodiments, the media guidance application determines the media asset that a user is describing based on comparing the metadata of each media asset in the user's history with the words extracted from the user's conversation. For example, the media guidance application may calculate the amount of extracted words from the user's conversation that match metadata of each media asset. For example, if the media guidance application extracts "Ovi," "lift," and "cup" from the conversation between a first and second user and matches "lifts" and "cup" with metadata for the final game of the 2018 Stanley Cup Finals, then the media guidance application would have a count of 2. The media guidance application may also match "OVI" with a video that summarizes "Operating Vehicle Impaired ("OVI") laws" with a count of 1 and may match "cup" with a "World Cup" match with a count of 1. The media guidance application may determine the media asset that the first user is describing based on the calculated amount of words for each corresponding media asset. Carrying through the prior example, the count of 2 for the final game of the 2018 Stanley Cup finals may be greater than the number of matches for other media assets, e.g., a count of 1.

In some embodiments, the media guidance application determines, based on segment metadata associated with different segments of a media asset, the segment of the media asset that the first user is describing according to the following. The media guidance application may compare text of each metadata entry that corresponds with a different segment of the identified media asset with the words extracted from the user's conversation. For example, metadata associated with the first period of the final game of the 2018 Stanley Cup Finals may indicate the score of the game at different moments, highlights of goals scored, penalties taken, big hits, and other pertinent moments in the action. Metadata associated with, for illustrative purposes, the segment of the final game from 3:48:05 to 3:52:02 may have associated metadata marking the segment as "Alexander Ovechkin ("Ovi") lifts the Stanley Cup." The media guidance application may identify a metadata entry with a largest amount of words matching the extracted words. For example, if the media guidance application extracts the words "Ovi", "lift", and "cup" from the user's conversation, then the metadata associated with the segment of the final game from 3:48:05 to 3:52:02 may match three words as compared to other segments of the final game having metadata matching fewer words. The media guidance application may then select the segment corresponding to the metadata entry with the largest amount of words matching the plurality of words.

In some embodiments, the media guidance application generates for display, to the second user, the indication of the segment based on a device associated with the second, i.e., target user. The media guidance application may identify an electronic device associated with the second user. For example, the media guidance application may access a repository of information identifying various devices in use by the target user, e.g., a mobile phone, a set-top box, a tablet, a personal computer, etc. In some embodiments, the media guidance application may identify the electronic device in use by the target user based on the target user being logged in to the electronic device. In some embodiments, the media guidance application may use network discovery to identify electronic devices in communication with a user device in use by the target user. The media guidance application may generate for display the indication of the segment on the electronic device. For example, the media guidance application may display a link to the segment on the target user's phone.

In some embodiments, the media guidance application may obtain confirmation that the segment of the media asset was correctly identified. The media guidance application may transmit, to the first user at the first device, a request to confirm that the segment was correctly identified. For example, the media guidance application may transmit a query to the first user on a device in use by the first user, e.g., a smartphone, that describes the segment identified, e.g., "Ovechkin lift the Stanley Cup" or the time markers of the identified segment, e.g., 3:48:05 to 3:52:02. The media guidance application may then receive, in response to the request to confirm, a response from the first user. For example, the media guidance application may receive a data communication from the user's cellular phone that indicates "yes" or "no" for whether the identified segment was the segment the source user intended to share with the target user.

The media guidance application may determine whether the response from the first user indicates that the segment was correctly identified. And in response to determining that the segment was not correctly identified, the media guidance application transmits to the first user a request to identify the correct media asset. For example, the media guidance application may transmit a list of candidate segments from a media asset with a largest amount of metadata matching the words extracted from the conversation between the users.

In some embodiments, the media guidance application extracts keywords from a voice conversation between a source user and a target user. The media guidance application may calculate a relevance score for media assets listed in a viewing history of the source user. For example, the media guidance application may determine the relevance each media asset in the viewing history to the extracted keywords. The media guidance application may select a playback media asset from the plurality of media assets listed in the viewing history of the source user based on selecting the media asset with the highest relevance score. The media guidance application may retrieve data indicative of interactions made by the source user with the playback media asset. For example, the media guidance application may retrieve a history of commands made by the source user to the media guidance application during viewing of the playback media asset. The media guidance application may determine a relevant portion of the playback media asset based on the data indicative of the interactions made by the source user with the playback media asset. The media guidance application may then transmit the relevant portion of the playback media asset to a user device associated with the target user.

In some embodiments, the media guidance application calculates a relevance score for each of the plurality of media assets according to the following process. The media guidance application may retrieve attributes of respective media assets, and, for each of the extracted keywords from the user's conversation, perform the following operations. The media guidance application may calculate a similarity score between the respective keyword and each of the attributes. The media guidance application may determine whether a calculated similarity score exceeds a threshold score, for example, the similarity score between an attribute of the media asset and an extracted keyword calculated based on natural language processing, e.g., latent semantic analysis. If that score is higher than a threshold configured in the media guidance application, then the keyword is considered relevant to the media asset. In response to determining that the calculated similarity score exceeds the threshold score, the media guidance application may add the calculated similarity score to the relevance score.

In some embodiments, the data indicative of interactions made by the source user with the playback media asset indicates the user interacted with the playback media asset in a trick play mode of operation. For example, the media guidance application may use data indicating that a source user played back one or more portions of the playback media asset in slow motion playback. In some embodiments, the media guidance application may analyze interaction data to determine whether the source user replayed specific portions of the playback media asset during viewing and determine how many times the source user replayed those portions. In response to determining that the data indicative of interactions made by the source user with the playback media asset indicates the source user replayed portions of the playback media asset during viewing, the media guidance application may determine a segment of the playback media asset.

For example, the media guidance application may identify a first time point of the playback media asset corresponding with a start time of a portion of the playback media asset which the source user replayed and identify a second time point of the playback media asset corresponding with an end time of the portion of the playback media asset which the source user replayed. The media guidance application may determine the number of times the source user replayed the specific portion of the playback media asset between the start time and the end time. Based on that information, the media guidance application may determine the relevant portion of the playback media asset based on the data indicative of the interactions made by the source user with the playback media asset by selecting a replayed portion of the playback media asset that was replayed by the source user a larger number of times than other portions of the playback media asset.

In some embodiments, the media guidance application may retrieve social media data indicative of social media interactions made by the source user while viewing the playback media asset. For example, the media guidance application may extract social media data from the data indicative of interactions made by the source user with the playback media asset. The media guidance application may then identify portions of the playback media asset that the source user shared on social media. For example, the media guidance application may correlate the social media data with the data indicative of interactions made by the source user with the playback media asset. In some embodiments, the media guidance application identifies candidate portions of the playback media asset associated with social media data indicative of social media interactions that were correlated with the data indicative of interactions made by the source user with the playback media asset. For example, the media guidance application may determine that the source user shared a portion of the final game of the 2018 Stanley Cup with his social media circle. The media guidance application may then select one of the candidate portions of the playback media asset that is associated with more social media interactions made by the source user as compared to other candidate portions of the playback media asset.

In some embodiments, the media guidance application identifies candidate portions of the playback media asset associated with interactions made by the source user with the playback media asset. The media guidance application may retrieve preferences of the target user and compare the preference of the target user with attributes of the candidate portions of the playback media asset. The media guidance application may then select the relevant portion of the playback media asset from the candidate portions based on the comparison of the preference of the target user with attributes of the candidate portions of the playback media asset. In some embodiments, the media guidance application selects a user device from a plurality of user devices based on the target user's preferences for watching content similar to the portion on a specific device.

It should also be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts another illustrative flowchart of a process for generating, for display, an indication of a segment of media content relevant to a communication between two users, in accordance with some embodiments of the disclosure;

FIG. 7 depicts an illustrative flowchart of a process for determining whether a source user is describing media content in a user conversation, in accordance with some embodiments of the disclosure;

FIG. 8 depicts an illustrative flowchart of a process for retrieving metadata about media assets in a source user's viewing history, in accordance with some embodiments of the disclosure;

FIG. 9 depicts an illustrative flowchart of a process for determining a media asset being described by a source user in a conversation, in accordance with some embodiments of the disclosure;

FIG. 10 depicts an illustrative flowchart of a process for determining a segment of a media asset being described by a source user in a conversation, in accordance with some embodiments of the disclosure; and FIG. 11 depicts an illustrative flowchart of a process for generating, for display to a target user, an indication of a segment of a media asset being described by a source user in a conversation, in accordance with some embodiments of the disclosure.

DETAILED DESCRIPTION

For example, a media guidance application, using control circuitry, generates for display an indication of a segment of media content relevant to a voice communication between two users. The media guidance application does this by monitoring a voice communication between a first user (i.e., a source user) at a first communication device (e.g., a smartphone) and a second user (i.e., a target user) at a second communication device (e.g., smartphone). For example, the first user may be discussing a recent sporting event (e.g., when the Washington Capitals won the 2018 Stanley Cup Championship) with a second user. The media guidance application may extract from the voice communication words spoken by the first user. For example, the source user may ask the target user, "Did you see Ovi lift the cup?" which is a reference to the Capitals' captain, Alexander Ovechkin, lifting the champions trophy. In this example, the second user may not have seen that event, and the first user may desire to share a particular segment of the event with the second user. By monitoring a conversation between two users, the media guidance application locates the media asset of interest, e.g., a replay of the final game of the 2018 Stanley Cup Championship).

Figure 1A:
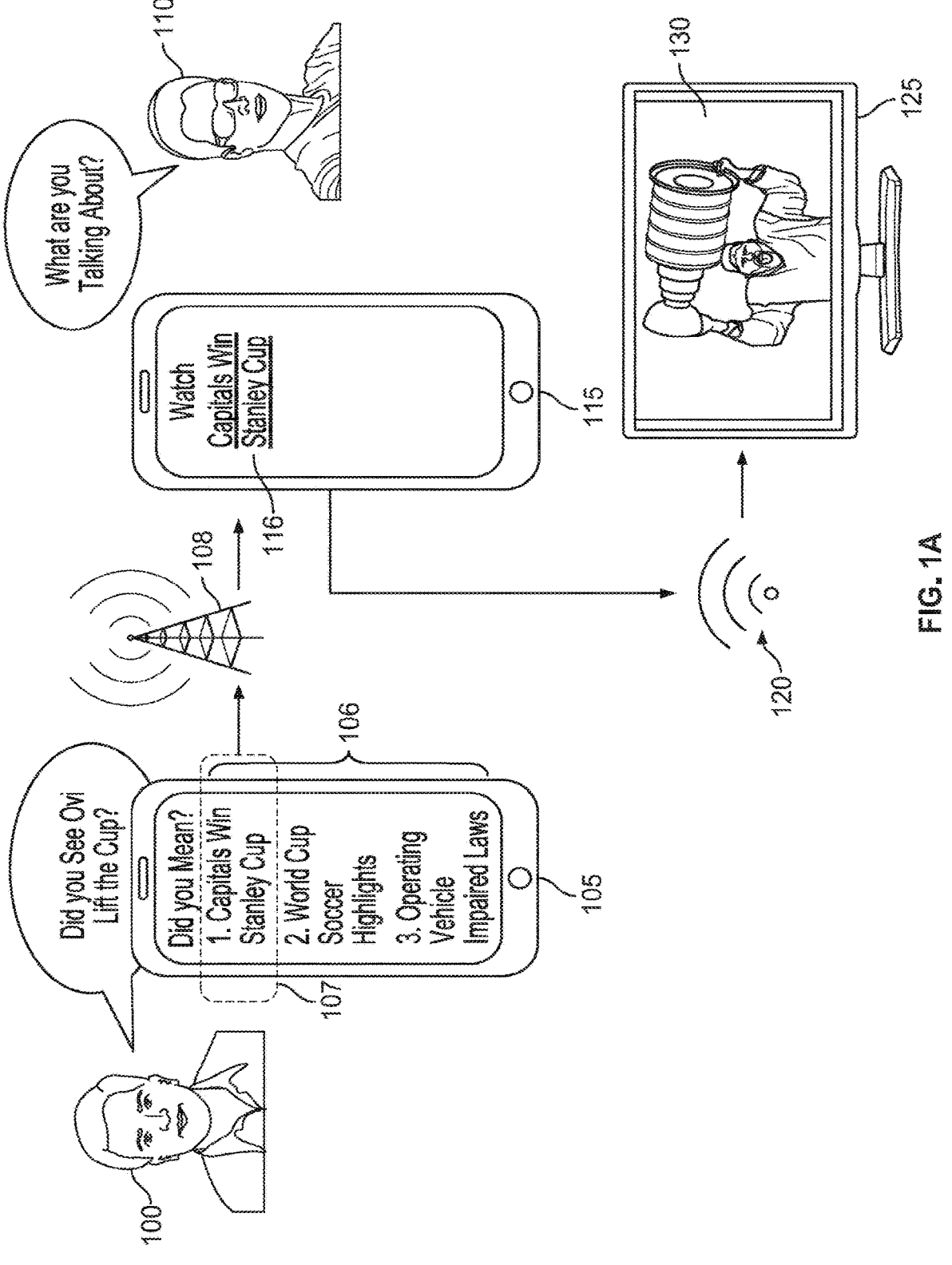
FIGS. 1A and 1B depict illustrative embodiments of a media guidance application that generate, for display, an indication of a segment of media content relevant to a communication between two users, in accordance with some embodiments of the disclosure.
Figure 1B:
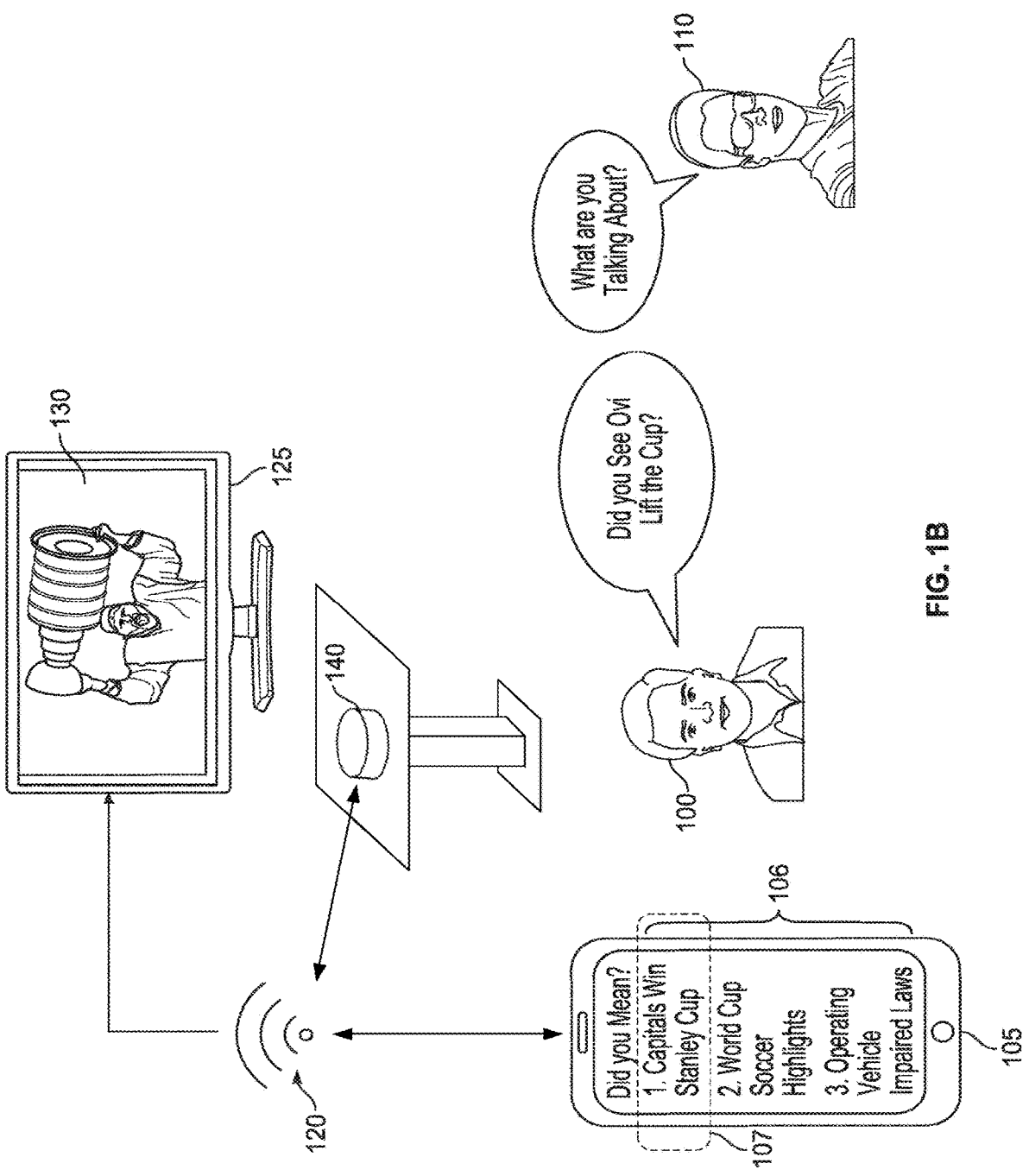

FIG. 1A and FIG. 1B depict illustrative embodiments of a media guidance application that generate, for display, an indication of a segment of media content relevant to a voice communication between two users, in accordance with some embodiments of the disclosure. For example, a source user 100 may be in conversation with a target user 110 and the source user 100 may ask "Did you see Ovi lift the cup?", referring to Alexander Ovechkin lifting the Stanley Cup after the final game of the 2018 Stanley Cup Championship between the Washington Capitals and the Las Vegas Golden Knights.

As depicted in FIG. 1A, the media guidance application may be monitoring the voice communication between a source user 100, at a first communication device 105, and the target user 110 at a second communication device 115. For example, the source user 100 and the target user 110 may be communicating on cellular phones, smartphones, tablets, personal computers, teleconference, or other suitable communications means. In some embodiments, the users may also communicate by text message and the media guidance application may monitor textual communications; e.g., text message, instant message, electronic mail. The source user's 100 communication device 105 may communicate wireless with an access point 108 that relays communications to the target user's 110 communication device 115. For example, the access point 108 may be a cellular tower providing 4G communication with the communication device 105 which communicates through a telecommunication system, such as a nationwide network or through the Internet. The access point 108 may be a Wi-Fi access point or any other sufficient communication medium. In some embodiments, the communication device 105 may be wired to a communication device rather than, as depicted, communicating wirelessly.

As depicted in FIG. 1B, the media guidance application may be monitoring the voice communication between a source user 100 and a target user 110 that are communicating directly between one another, i.e., in the same room. In such a scenario, the media guidance application may monitor the communication using a third device, i.e., a passive listening device such as user equipment 140. In some embodiments, the media guidance application may monitor the communication using a communication device of one of the users, e.g., communication device 105. In some embodiments, the media guidance application may relay audio signals captured through a microphone to a remote server or other device that implements the media guidance application. In some embodiments, the media guidance application may be implemented by the passive listening device, e.g., user equipment 140.

The media guidance application may determine, based on the voice communication, that the source user 100 is describing media content. For example, the media guidance application may obtain audio recorded by a microphone in a communication device, passive listening device, or other communication device. The media guidance application may extract keywords from the conversation that indicate the source user 100 is describing something the source user 100 has seen. In some embodiments, the media guidance application may analyze speech using speech recognition algorithms to extract the pertinent features from the audio of the conversation. The media guidance application may give each of the pertinent features of a conversation a weight, Wx, according to the importance of that feature. The media guidance application may extract parts of the speech by using syntactical and semantic parsing and using a data source of pertinent text. The media guidance application may give the different extracted features different weights using part-of-speech ("POS") tagging or other natural language processing approaches. Further, the media guidance application may give phrases from predefined indexes other weights. The media guidance application may compare phrases, e.g., sets of words occurring between stop words, also called n-grams, with known phrases from a database of pertinent phrases.

In response to determining that the source user 100 is describing the media content, the media guidance application may retrieve a media asset viewing history of the source user 100. For example, the media guidance application may contact a remote server to access a user profile of the source user 100 that includes a log of all media content consumed through a specific media service, e.g., YouTube. The viewing history may be obtained via web API and provided as a JSON file. The viewing history may also be a series of entries in a comma separated value text file, an array of key-value pairs, an excel data file, a SQLite data file, SQL server response, or other data set that contains information sufficient to identify media content a user consumed.

The media guidance application may use the conversation between the source user 100 and the target user 110 to identify a media asset in the media asset viewing history that is being described by the source user 100. For example, if the source user 100 has a viewing history that includes the final game of the 2018 Stanley Cup Championship and the conversation includes the phrase "Did you see Ovi lift the cup?" then the media guidance application may match keywords from the conversation with metadata of the media asset in the viewing history. For example, metadata for the final game of the 2018 Stanley Cup Championship could include "NHL," "hockey," "Washington D.C.," "Las Vegas," "Stanley Cup," "Capitals," "Ovechkin," "Marc Andre-Fleury," "Golden Knights," "lift," etc. The media guidance application may correlate "Did you see Ovi Life the cup?" by splitting the sentence into words, performing speech-to-text recognition, and comparing each word to the metadata. Or the media guidance application may train a model with the metadata of each media asset in the user's viewing history to develop a history model for that user and then feed the user's speech into the history model for that user to determine a media asset that matches the user's conversation. Further, the media guidance application may continually feed new parts of the conversation into the model to update the predicted media asset. Moreover, the speech from the target user 110 may be fed into the model to further refine the prediction of the matching media asset.

The media guidance application may use metadata of the media asset to determine a segment of the media asset that the source user is describing. For example, the media guidance application may detect annotation in the data of the media asset corresponding to different portions of the media asset. Or the media guidance application may retrieve annotations from a remote server that correlate events in the media asset with start and end times in the media asset. The media guidance application may transmit an indication of the segment to the target user 110. In some embodiments, the media guidance application may also be in communication with the communication device 115 of the target user 110 and may generate, for display on the communication device 115, the indication of the segment. For example, the media guidance application may generate a link to the segment of the media asset to be displayed to the target user.

The media guidance application may also receive input from the target user 110 indicating the target user 110 is commanding the media guidance application to generate playback of the segment on a playback device. In some embodiments, the playback may be performed on the communication device 115. In some embodiments, the playback may be achieved on a display device 125, e.g., a television or computer screen, that is in communication with the media guidance application or with the communication device 115. For example, the communication device 115 may communicate through a wireless network 120 with the display device 125 using a protocol such AirPlay®, UPnP®, or DLNA® to transmit a stream of playback for display.

In some embodiments, the media guidance application may compare words from the conversation between the source user 100 and target user 110 with keywords that indicate that media content is being described. For example, the media guidance application may extract the words "did you see" from the conversation, which suggest that media content is being described. The media guidance application may be configured with other trigger words that indicate media content is being described. The media guidance application may, based on the comparison, determine that the first user is describing media content. For example, the media guidance application may correlate the users' conversation with trigger words.

If the source user 100 is describing media content, the media guidance application may respond by identifying a portion of the media content to share. The media guidance application may retrieve metadata for several media assets that the source user 100 previously consumed. For example, the media guidance application may use the source user's 100 viewing history to obtain media assets that were viewed in the past day, week, month, or year and pull metadata for those media assets that provide descriptive content. For example, the media guidance application may retrieve a set of data including identifier, media title, and viewing timestamp such as depicted in Table 1.

TABLE 1

| Exemplary Source User Viewing History | | |
| --- | --- | --- |
| Id | Media Title | Viewing Timestamp |
| 984894156 | Game 5, 2018 Stanley Cup Championship | 6/7/2018 5:00 PM-8:30 PM |
| 231894132 | Legal Education Summary, Vehicle Laws | 6/8/2018 9:00 AM-2:00 PM |

TABLE 1-continued

| Exemplary Source User Viewing History | | |
| --- | --- | --- |
| Id | Media Title | Viewing Timestamp |
| 561329813 | World Cup Soccer, UEFA Group C Finals | 10/5/2017 4:00 PM-4:15 PM |
| 321987132 | Mindhunter | 12/1/2017 9:00 PM-10:00 PM |

By using this information, the media guidance application may identify relevant media content without requiring the source user 100 to interact with complicated user menus across large media choices. In the example of the source user 100 having watched the final game of the Stanley Cup Finals, the media guidance application would retrieve metadata associated with that showing, for example, a list of words including: "NHL," "hockey," "Washington D.C.," "Las Vegas," "Stanley Cup," "Capitals," "Ovechkin," "Marc Andre-Fleury," "Golden Knights," "lift," etc. The media guidance application may retrieve metadata for each of the media assets in the source user's 100 viewing history being considered as a possible match. For example, the media guidance application may retrieve a description of the media asset in association with an Id of each media asset as depicted in Table 2.

TABLE 2

| Exemplary Metadata of Media Assets from Viewing History | |
| --- | --- |
| Id | Description |
| 984894156 | "Watch as Alexander Ovechkin and the Washington Capitals defeat Marc Andre-Fleury, the Las Vegas Golden Knights, and 40 years of history to finally lift the cup." |
| 231894132 | "This continuing legal education series focuses on laws needed by lawyers in California to defend clients involved in vehicle infractions, traffic stops, reckless driving stops, and OVI ("operating vehicle impaired") arrest." |
| 561329813 | "Germany earns another berth to the World Cup." |
| 321987132 | "A crime drama based on the book with same name. Watch as the FBI interviews serial killers, adapts to new psychological techniques, and challenges the old guard." |

The media guidance application may compare the metadata of each media asset in the user's watch list to a plurality of words extracted from the conversation. In this case, "cup" has a correlation with "Stanley Cup" in the metadata from the source user's 100 watch list. The source user's 100 watch list may also contain entries for other media assets with metadata that correlate with words extracted from the conversation, e.g., a "World Cup 2 0 Soccer" match and "Operating Vehicle Impaired ("OVI") Laws" summary video.

The media guidance application may determine, based on comparing the metadata of each media asset with the extracted words, a media asset that the source user 100 is describing. For example, "lift," "Ovi," and "cup" may be found as weighted matches from the users' conversation with metadata about the final game of the 2018 Stanley Cup Finals. The media guidance application may also retrieve metadata entries corresponding to different segments of the matching media asset. For example, a portion of the media asset marked from 3:48:05 to 3:52:02 may have associated metadata marking the segment as "Alexander Ovechkin lifts the Stanley Cup." The media guidance application may determine a segment of the media asset that the source user 100 is describing based on the associated metadata. For example, the media guidance application may match "lift", "Ovi", and "cup" with the metadata of the segment. The media guidance application may generate, for display to the target user 110, an indication of the segment. For example, the media guidance application may present a link 116 to the target user 110 to watch a particular segment of the identified media asset.

In some embodiments, the media guidance application may compare the words extracted from the users' conversation the according to the following. The media guidance application may select a first word from the conversation words. For example, the media guidance application may select "see" from the extracted words. The media guidance application may compare the selected word to each keyword. For example, media guidance application may be configured to consider the word "see" to be a keyword suggest that media content is being described. The media guidance application may determine, based on comparing the first word of the extracted words with each keyword of the keywords, whether the first word matches any of the plurality of keywords. In response to determining that the first word matches a keyword from the plurality of keywords, updating a word matching score. For example, the media guidance application may utilize a scoring metric, e.g., the word matching score, to track how many keywords are matched in the conversation, and/or what weight to give the matching words, to determine whether the user is discussing a media content. This may comprise a simple count of extracted conversation words that match the trigger keywords or may comprise a more complex weighted value system.

In some embodiments, the media guidance application may retrieve a weight associated with the first keyword. For example, the media guidance application may determine that the word "did" has a relatively low weight, e.g., 0.01, the word "you" has an equally low weight, e.g., 0.01, and "see" has a relatively moderate weigh of 0.30. In some embodiments, the media guidance application may analyze the weight of phrases as well. For example, the media guidance application may consider "did you see" to have a moderately high rate of, e.g., 0.80. The media guidance application may update the word matching score with the weight associated with the first keyword.

In some embodiments, the media guidance application determines whether the word matching score is greater than a threshold value. For example, the media guidance application may determine that a score of less than 0.10 does not meet a threshold needed to consider the conversation is indicating the user is discussing media content. In response to determining that the word matching score is greater than the threshold value, the media guidance application determines that the source user 100 is describing media content.

In some embodiments, the media guidance application retrieves metadata for each of the plurality of media assets that the source user 100 previously consumed comprised according to the following. The media guidance application may transmit, to a profile server, a request for media asset viewing history of the source user 100. For example, the media guidance application may identify a user according to the user's name, login information (e.g., username and/or e-mail address), account information, or other unique identifier. The media guidance application may contact a remote server, e.g., a web server, API host, database server, or other system with information requesting a user's viewing history. For example, the media guidance application may utilize a JSON (JavaScript Object Notation) request sent to a web application programming interface that specifies the information being sent, e.g., viewing history, and identifier of the user, e.g., the source user 100. In some embodiments, the media guidance application may also include a time period for which the information is sought, e.g., 24 hours. The media guidance application may receive, in response to the request for the media asset viewing history, a plurality of media asset identifiers, wherein each of the plurality of media asset identifiers identifies a media asset the source user 100 has previously consumed. For example, the media guidance application may receive a JSON response with a list of titles, or unique IDs. The media guidance application may then transmit, to a metadata repository for each of the plurality of media asset identifiers, a request for metadata corresponding to the media assets. For example, the media guidance application may request, using a JSON API request, information describing each media asset in the user's history from a server that houses such information. In response to the request for the corresponding metadata, the media guidance application may receive a corresponding data structure associated with the corresponding metadata. For example, the media guidance application may receive list of arrays of strings, i.e., metadata, that describe the requested media assets in association, i.e., as key-value pairs, with identifiers for each media asset.

In some embodiments, the media guidance application determines the media asset that a source user 100 is describing based on comparing the metadata of each media asset in the source user's 100 history with the words extracted from the source user's 100 conversation. For example, the media guidance application may calculate the amount of extracted words from the user's conversation that match metadata of each media asset. For example, if the media guidance application extracts "Ovi," "lifts," and "cup" from the conversation between a source user 100 and target user 110 and matches "lifts" and "cup" with metadata for the final game of the 2018 Stanley Cup Finals, then the media guidance application would have a count of 2. The media guidance application may also match "OVI" with a video that summarizes "Operating Vehicle Impaired ("OVI") laws" with a count of 1 and may match "cup" with a "World Cup" match with a count of 1. The media guidance application may determine the media asset that the source user 100 is describing based on the calculated amount of words for each corresponding media asset. Carrying through the prior example, the count of 2 for the final game of the 2018 Stanley Cup finals may be greater than the number of matches for other media assets, e.g., count of 1.

In some embodiments, the media guidance application determines, based on segment metadata associated with different segments of a media asset, the segment of the media asset that the source user 100 is describing according to the following. The media guidance application may compare text of each metadata entry that corresponds with a different segment of the identified media asset with the words extracted from the user's conversation. For example, metadata associated with the first period of the final game of the 2018 Stanley Cup Finals may indicate the score of the game at different moments, highlights of goals scored, penalties taken, big hits, and other pertinent moments in the action. Metadata associated with, for illustrative purposes, the segment of the final game from 3:48:05 to 3:52:02 may have associated metadata marking the segment as "Alexander Ovechkin ("Ovi") lifts the Stanley Cup." The media guidance application may identify a metadata entry with a largest amount of words matching the extracted words. For example, if the media guidance application extracts the words "Ovi," "lift," and "cup" from the source user's 100 conversation, then the metadata associated with the segment of the final game from 3:48:05 to 3:52:02 may match three words as compared to other segments of the final game having metadata matching fewer words. The media guidance application may then select the segment corresponding to the metadata entry with the largest amount of words matching the plurality of words.

In some embodiments, the media guidance application generates for display, to the target user 110, the indication of the segment based on a device associated with the second, i.e., target user. The media guidance application may identify an electronic device, e.g., communication device 115, associated with the target user 110. For example, the media guidance application may access a repository of information identifying various devices in use by the target user 110, e.g., a mobile phone 115, a set-top box, a tablet, a personal computer, a television 125, etc. In some embodiments, the media guidance application may identify the electronic device in use by the target user 110 based on the target user 110 being logged in to the electronic device. In some embodiments, the media guidance application may use network discovery to identify electronic devices in communication with a user device in use by the target user 110. The media guidance application may generate for display the indication of the segment on the electronic device, e.g., communication device 115. For example, the media guidance application may display a link to the segment on the target user's 110 phone 115.

In some embodiments, the media guidance application may obtain confirmation that the segment of the media asset was correctly identified. The media guidance application may transmit, to the source user 100 at the first device 105, a request to confirm that the segment was correctly identified. For example, the media guidance application may transmit a query to the source user 100 on a device 105 in use by the source user 100, e.g., a smartphone, that describes the segment identified, e.g., "Ovechkin lift the Stanley Cup" or the time markers of the identified segment, e.g., 3:48:05 to 3:52:02. The query may be a text message to be displayed on the communication device 105, a yes/no prompt, a short clip playing the identified segment, a voice prompt, or any input/output method for obtaining user input. The media guidance application may then receive, in response to the request to confirm, a response from the source user 100. For example, the media guidance application may receive a data communication from the user's cellular phone that indicates "yes" or "no" for whether the identified segment was the segment the source user intended to share with the target user.

The media guidance application may determine whether the response from the source user 100 indicates that the segment was correctly identified. And in response to determining that the segment was not correctly identified, the media guidance application transmits to the source user 100 a request to identify the correct media asset. For example, the media guidance application may transmit a list 106 of candidate segments from a media asset with a largest amount of metadata matching the words extracted from the conversation between the users. The media guidance application may then receive a selection 107 of the correct media asset.

In some embodiments, the media guidance application extracts keywords from a conversation between a source user 100 and a target user 110. The media guidance application may calculate a relevance score for media assets listed in a viewing history of the source user 100. For example, the media guidance application may determine the relevance each media asset in the viewing history to the extracted keywords. The media guidance application may select a playback media asset from the plurality of media assets listed in the viewing history of the source user 100 based on selecting the media asset with the highest relevance score. The media guidance application may retrieve data indicative of interactions made by the source user 100 with the playback media asset. For example, the media guidance application may retrieve a history of commands made by the source user 100 to the media guidance application during viewing of the playback media asset. The media guidance application may determine a relevant portion of the playback media asset based on the data indicative of the interactions made by the source user 100 with the playback media asset. The media guidance application may then transmit the relevant portion of the playback media asset to a user device associated with the target user 110.

In some embodiments, the media guidance application calculates a relevance score for each of the plurality of media assets according to the following process. The media guidance application may retrieve attributes of respective media assets, and, for each of the extracted keywords from the user's conversation, perform the following operations. The media guidance application may calculate a similarity score between the respective keyword and each of the attributes. The media guidance application may determine whether a calculated similarity score exceeds a threshold score, for example, the similarity score between an attribute of the media asset and an extracted keyword calculated based on natural language processing, e.g., latent semantic analysis. If that score is higher than a threshold configured in the media guidance application, then the keyword is considered relevant to the media asset. In response to determining that the calculated similarity score exceeds the threshold score, the media guidance application may add the calculated similarity score to the relevance score.

In some embodiments, the media guidance application the data indicative of interactions made by the source user 100 with the playback media asset indicates the user interacted with the playback media asset in a trick play mode of operation. For example, the media guidance application may use data indicating that a source user 100 played back one or more portions of the playback media asset in slow motion playback. In some embodiments, the media guidance application may analyze interaction data to determine whether the source user 100 replayed specific portions of the playback media asset during viewing and determine how many times the source user 100 replayed those portions. In response to determining that the data indicative of interactions made by the source user 100 with the playback media asset indicates the source user 100 replayed portions of the playback media asset during viewing, the media guidance application may determine a segment of the playback media asset.

For example, the media guidance application may identify a first time point of the playback media asset corresponding to a start time of a portion of the playback media asset which the source user 100 replayed and identify a second time point of the playback media asset corresponding to an end time of the portion of the playback media asset which the source user 100 replayed. The media guidance application may determine the number of times the source user 100 replayed the specific portion of the playback media asset between the start time and the end time. Based on that information, the media guidance application may determine the relevant portion of the playback media asset based on the data indicative of the interactions made by the source user 100 with the playback media asset by selecting a replayed portion of the playback media asset that was replayed by the source user 100 a larger number of times than other portions of the playback media asset.

In some embodiments, the media guidance application may retrieve social media data indicative of social media interactions made by the source user 100 while viewing the playback media asset. For example, the media guidance application may extract social media data from the data indicative of interactions made by the source user 100 with the playback media asset. The media guidance application may then identify portions of the playback media asset that the source user 100 shared on social media. For example, the media guidance application may correlate the social media data with the data indicative of interactions made by the source user 100 with the playback media asset. In some embodiments, the media guidance application identifies candidate portions of the playback media asset associated with social media data indicative of social media interactions that was correlated with the data indicative of interactions made by the source user 100 with the playback media asset. For example, the media guidance application may determine that the source user 100 shared a portion the final game of the 2018 Stanley Cup with his social media circle. The media guidance application may then select one of the candidate portions of the playback media asset that is associated with more social media interactions made by the source user 100 as compared to other candidate portions of the playback media asset.

In some embodiments, the media guidance application identifies candidate portions of the playback media asset associated with interactions made by the source user 100 with the playback media asset. The media guidance application may retrieve preferences of the target user 110 and compare the preference of the target user 110 with attributes of the candidate portions of the playback media asset. The media guidance application may then select the relevant portion of the playback media asset from the candidate portions based on the comparison of the preference of the target user 110 with attributes of the candidate portions of the playback media asset. In some embodiments, the media guidance application selects a user device from a plurality of user devices based on the target user's 110 preferences for watching content similar to the portion on a specific device.

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
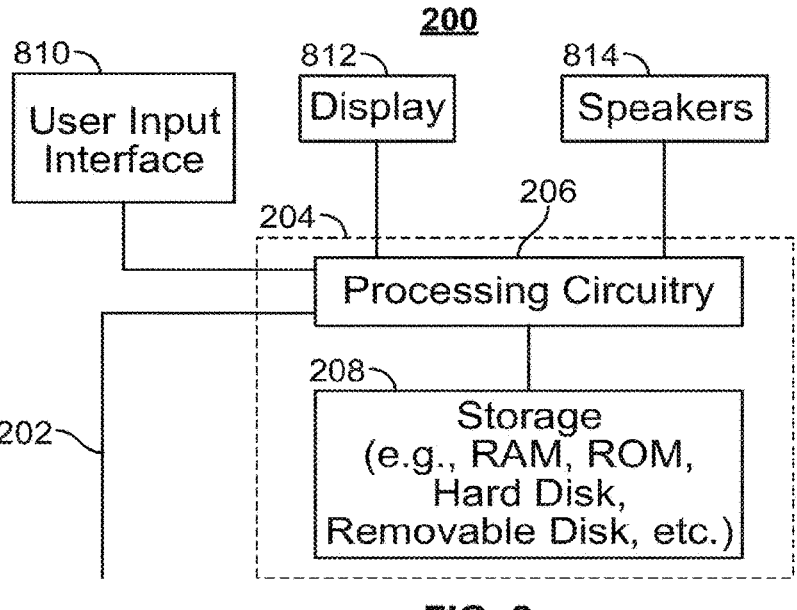
FIG. 2 is a block diagram of an illustrative media system, in accordance with some embodiments of the disclosure.

Users may access content and the media guidance application (and its display screens described above and below)

from one or more of their user equipment devices. FIG. 2 shows a generalized embodiment of illustrative user equipment device 200. More specific implementations of user equipment devices are discussed below in connection with FIG. 3. User equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media guidance application stored in memory (i.e., storage 208). Specifically, control circuitry 204 may be instructed by the media guidance application to perform the functions discussed above and below. For example, the media guidance application may provide instructions to control circuitry 204 to generate the media guidance displays. In some implementations, any action performed by control circuitry 204 may be based on instructions received from the media guidance application.

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive media guidance application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

The guidance application may be implemented using any suitable architecture. For example, it may be a stand-alone application wholly-implemented on user equipment device 200. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the media guidance application is a client-server based application. Data for use by a thick or thin client implemented on user equipment device 200 is retrieved on-demand by issuing requests to a server remote to the user equipment device 200. In one example of a client-server based guidance application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the media guidance application is downloaded and interpreted or otherwise run by an interpreter or virtual machine (run by control circuitry 204). In some embodiments, the guidance application may be encoded in the ETV Binary Interchange Format (EBIF), received by control circuitry 204 as part of a suitable feed, and interpreted by a user agent running on control circuitry 204. For example, the guidance application may be an EBIF application. In some embodiments, the guidance application may be defined by a series of JAVA-based files that are received and run by a local virtual machine or other suitable middleware executed by control circuitry 204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
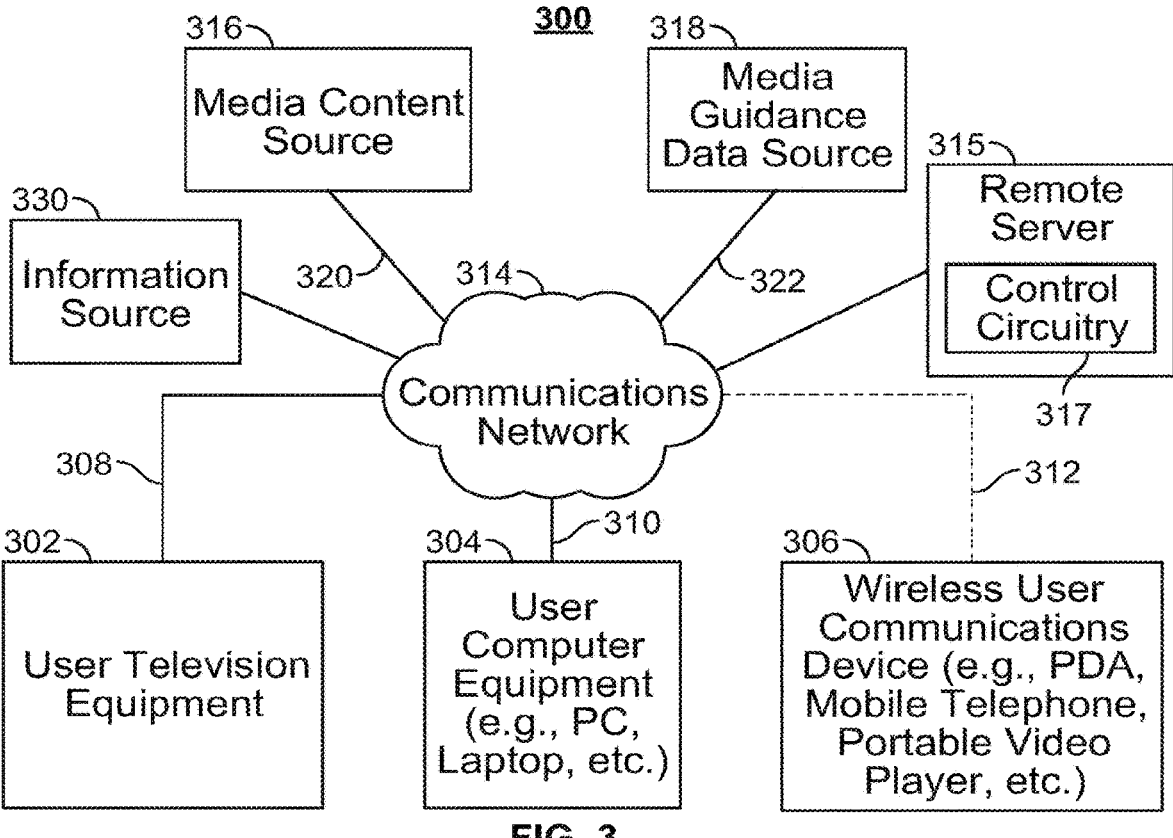
FIG. 3 is a block diagram of an illustrative media system, in accordance with some embodiments of the disclosure.

User equipment device 200 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The media guidance application may have the same layout on various different types of user equipment or may be tailored to the display capabilities of the user equipment. For example, on user computer equipment 304, the guidance application may be provided as a web site accessed by a web browser. In another example, the guidance application may be scaled down for wireless user communications devices 306.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths, but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or freeTV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 208, and executed by control circuitry 204 of a user equipment device 200. In some embodiments, media guidance applications may be client-server applications where only a client application resides on the user equipment device, and server application resides on a remote server. For example, media guidance applications may be implemented partially as a client application on control circuitry 204 of user equipment device 200 and partially on a remote server as a server application (e.g., media guidance data source 318) running on control circuitry of the remote server. When executed by control circuitry of the remote server (such as media guidance data source 318), the media guidance application may instruct the control circuitry to generate the guidance application displays and transmit the generated displays to the user equipment devices. The server application may instruct the control circuitry of the media guidance data source 318 to transmit data for storage on the user equipment. The client application may instruct control circuitry of the receiving user equipment to generate the guidance application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 316 to access content. Specifically, within a home, users of user television equipment 302 and user computer equipment 304 may access the media guidance application to navigate among and locate desirable content. Users may also access the media guidance application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 304 or wireless user communications device 306 having content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that processes 400 and 500 or any step thereof could be performed on, or provided by, any of the devices shown in FIGS. 1-3. For example, any of processes 400 and 500 may be executed by control circuitry 204 (FIG. 2) as instructed by control circuitry implemented on user equipment 302, 304, 306 (FIG. 3), and/or a user equipment device for selecting a recommendation. In addition, one or more steps of processes 400 and 500 may be incorporated into or combined with one or more steps of any other process or embodiment.

It is contemplated that the steps or descriptions of each of FIGS. 4-11 may be used with any other embodiment of this disclosure. In addition, the steps and descriptions described in relation to FIGS. 4-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIGS. 4-11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 200, media content source 316, or media guidance data source 318. For example, a profile, as described herein, may be stored in, and retrieved from, storage 208 of FIG. 2, or media guidance data source 318 of FIG. 3. Furthermore, processing circuitry, or a computer program, may update settings of user equipment stored within storage 208 of FIG. 2 or media guidance data source 318 of FIG. 3.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

Figure 4:
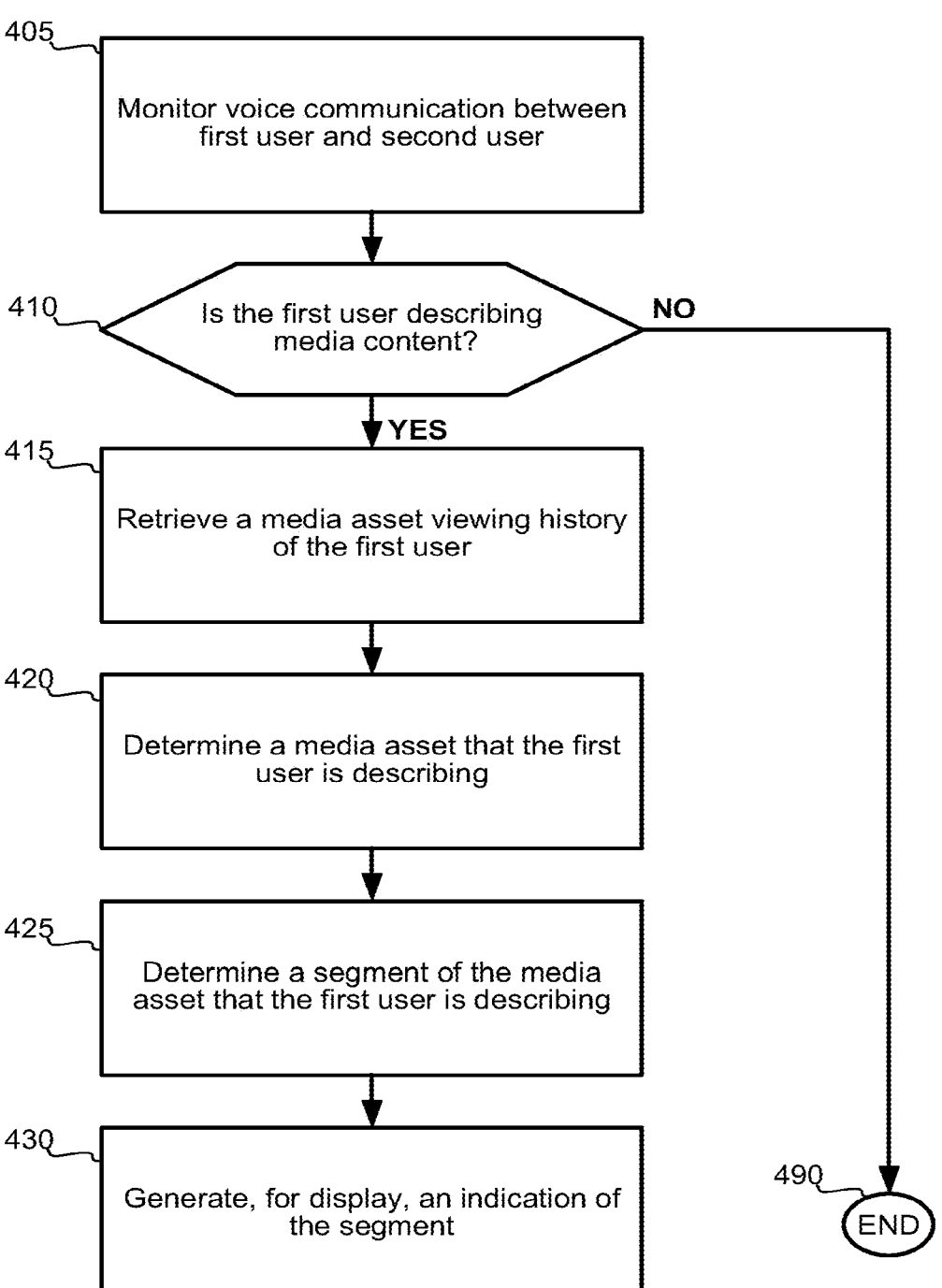
FIG. 4 depicts an illustrative flowchart of a process for generating, for display, an indication of a segment of media content relevant to a communication between two users, in accordance with some embodiments of the disclosure.

FIG. 4 depicts an illustrative flowchart of a process for generating, for display, an indication of a segment of media content relevant to a voice communication between two users, in accordance with some embodiments of the disclosure. Process 400, and any of the following processes, may be executed by control circuitry 204 (e.g., in a manner instructed to control circuitry 204 by the media guidance application). Control circuitry 204 may be part of user equipment (e.g., a device which may have any or all of the functionality of user television equipment 302, user computer equipment 304, and/or wireless communications device 306), or of a remote server communicating from the user equipment by way of communication network 314, or distributed over a combination of both.

Process 400 begins at 405 where control circuitry 204 monitors a voice communication between a first user at a first communication device, e.g., a communication device 105 with the functionality of user equipment 306 and a second user, e.g., target user 110, at a second communication device, e.g., communication device 115 with the functionality of user equipment 306.

Process 400 moves to 410, where control circuitry 204 determines, based on the voice communication, whether the first user is describing a media asset. If the control circuitry 204 determines, based on the voice communication, that the first user is not describing a media asset, then process 400 is complete at 490. In some embodiments, process 400 runs continuously until the control circuitry 204 determines that media content is described at 410. If the control circuitry 204 determines, based on the voice communication, that the first user is describing a media asset, then process 400 continues at 415.

At 415, control circuitry 204 retrieves a media asset viewing history of the first user. For example, the control circuitry 204 may use communication circuitry to contact a remote server 315 to obtain a profile of a source user 100. Process 400 continues at 420 with control circuitry 204 determining a media asset that the user is describing from the user's viewing history. At 425, process 400 continues, where control circuitry 204 determines a relevant segment of the media asset based on the retrieved media asset viewing history of the first user.

Process 400 continues at 430 with control circuitry 204 generating, for display to a second user, an indication of the segment. For example, the control circuitry 204 may generate a link 116 that is displayed to the target user 110 on wireless user communication device 306, e.g., communication device 115.

FIG. 5 depicts another illustrative flowchart of a process for generating, for display, an indication of a segment of media content relevant to a voice communication between two users, in accordance with some embodiments of the disclosure. Process 500, and any of the following processes, may be executed by control circuitry 204 (e.g., in a manner instructed to control circuitry 204 by the media guidance application). Control circuitry 204 may be part of user equipment (e.g., a device which may have any or all of the functionality of user television equipment 302, user computer equipment 304, and/or wireless communications device 306), or of a remote server communicating from the user equipment by way of communication network 314, or distributed over a combination of both.

Process 500 begins at 505 where control circuitry 204 monitors a voice communication between a first user at a first communication device, e.g., a communication device 105 with the functionality of user equipment 306, and a second user, e.g., target user 110, at a second communication device, e.g., communication device 115 with the functionality of user equipment 306.

Process 500 moves to 510, where control circuitry 204 extracts from the voice communication a plurality of words spoken by the first user. At 515, control circuitry 204 continues by comparing the plurality of words with a plurality of keywords. As described above, the media guidance application may obtain the keywords, for example, from a remote server, configuration, or hardcoded, and the keywords are indicators that the user is describing media content to a second user.

At 520, the control circuitry 204 determines, based on comparing the plurality of words with the plurality of keywords, whether the first user is describing media content. If the first user is not describing media content, then process 500 is complete at 590. If control circuitry 204 determines that the first user is describing media content, then process 500 continues on to 525.

At 525, control circuitry 204 retrieves metadata for each of a plurality of media assets that the first user previously consumed. For example, control circuitry 204 may use communication circuitry to obtain metadata from an information source 330, media content source 316, media guidance data source 318, or remote sever 315. At 530, control circuitry 204 compares the metadata of each media asset in the plurality of media assets that the first user has previously consumed with the plurality of words extracted from the voice communication.

Process 500 continues by determining, at 535, based on comparing the metadata of each media asset in the plurality of media assets that the first user has previously consumed with the plurality of words, a media asset that the first user is describing. At 540, process 500 retrieves a plurality of metadata entries, wherein each of the plurality of metadata entries comprises metadata for each of a plurality of segments of the media asset that the first user is describing. For example, control circuitry 204 may access a media asset and obtain, from within the media asset, information about the media asset. In some embodiments, control circuitry 204 may use communication circuitry to obtain metadata from an information source 330, media content source 316, media guidance data source 318, or remote sever 315. At 545, control circuitry 204 determines, based on the plurality of metadata entries and the plurality of words, a segment of the media asset that the first user is describing.

In some embodiments, control circuitry 204 continues process 500 at 550 by transmitting, to the first user at the first device, a request to confirm that the segment was correctly identified. For example, the control circuitry 204 may use communication circuitry to send an inquiry to communication device 105, including an indication of the segment, that asks the user whether the segment was properly identified. At 555, control circuitry 204 receives a response from the user.

In some embodiments, control circuitry 204 determines whether the response from the first user indicates that the segment was correctly identified. If the response indicates the segment was properly identified, then process 500 may continue at 570. If the response indicates the segment was not correctly identified, control circuitry 204 may continue process 500 by transmitting to the first user a request to identify the correct media asset. For example, control circuitry 204 may send a list of candidate segments as a set of links corresponding to a plurality of segments with a largest amount of metadata matching the plurality of words.

At 570, process 500 continues with control circuitry 204 generating, for display to the second user, an indication of the segment. For example, control circuitry 204 may generate a hyperlink to view the segment on a display device.

Figure 6:
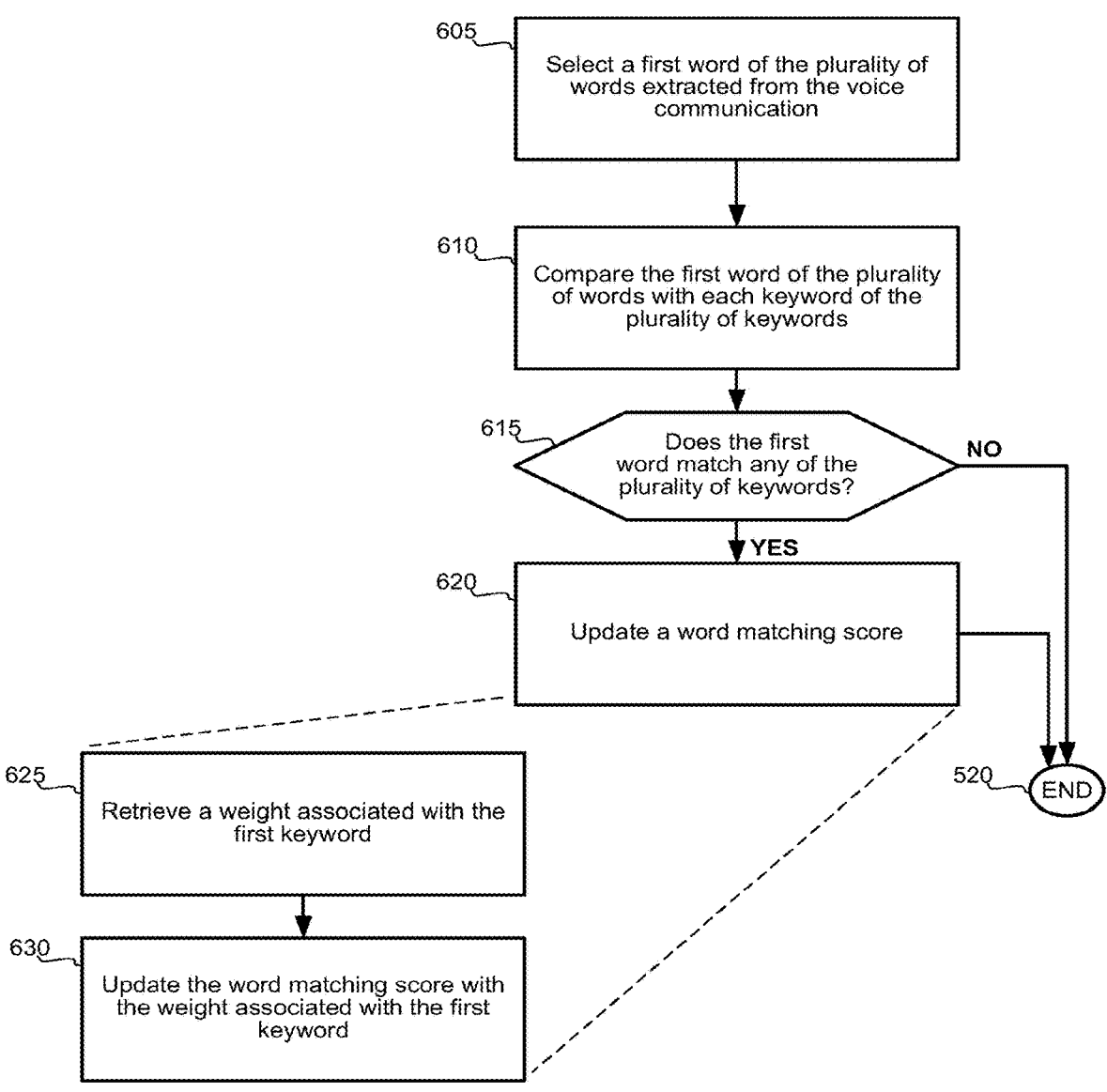
FIG. 6 depicts an illustrative flowchart of a process for comparing words extracted from a user conversation with keywords that indicate media content is being discussed, in accordance with some embodiments of the disclosure.

FIG. 6 depicts an illustrative flowchart of a process for comparing words extracted from a user conversation with keywords that indicate media content is being discussed, in accordance with some embodiments of the disclosure. Process 515A expands 515 of FIG. 5. Control circuitry 204 may continue from 510 at 605 by selecting a first word of the plurality of words extracted from the voice communication. At 610, control circuitry 204 compares the first word of the plurality of words with each keyword of the plurality of keywords. Process 515A continues at 615 where control circuitry 204 determines, based on comparing the first word of the plurality of words with each keyword of the plurality of keywords, whether the first word matches any of the plurality of keywords. If the control circuitry 204 determines the first word does not match any of the keywords, process 515A continues at 520.

In response to determining that the first word matches a keyword from the plurality of keywords, control circuitry 204 updates a word matching score at 620. In some embodiments, control circuitry 204 updates the word matching score by retrieving a weight associated with the first keyword. For example, control circuitry 204 may use communication circuitry to obtain weights from a remote server 315. Or the control circuitry 204 may retrieve the weights from storage 208. At 630, the control circuitry 204 may update the word matching score with the weight associated with the first keyword.

FIG. 7 depicts an illustrative flowchart of a process for determining whether a source user is describing media content in a user conversation, in accordance with some embodiments of the disclosure. Process 520A expands 520 of FIG. 5. Control circuitry 204 may continue from 515. For example, control circuitry 204 may continue by determining whether the word matching score is greater than a threshold value. In some embodiments, control circuitry 204 may retrieve a threshold value from a remote server, e.g., 315, from storage, e.g., 208, or from hardcoding. The threshold value is used by the control circuitry 204 to determine whether the control circuitry 204 established a sufficient match between words extracted from the users' conversation and the keywords that indicate media content is being discussed. In response to determining that the word matching score is greater than the threshold value, the control circuitry 204 determines, at 710, that the first user is describing media content.

FIG. 8 depicts an illustrative flowchart of a process for retrieving metadata about media assets in a source user's viewing history, in accordance with some embodiments of the disclosure. Process 525A expands 525 of FIG. 5. At 805, control circuitry 204 transmits, to a profile server, a request for media asset viewing history of the first user, wherein the request comprises an identifier of the first user. For example, control circuitry 204 uses communication circuitry to request a log of the media assets the source user 100 viewed in a specified time period, e.g., in the last seven days.

At 810, the control circuitry 204 continues by receiving, in response to the request for the media asset viewing history, a plurality of media asset identifiers. For example, the control circuitry 204 may receive, via communications circuitry, media asset identifiers that identify media assets the first user has previously consumed. Process 525A continues at 815, where control circuitry 204 transmits, to a metadata repository for each of the plurality of media asset identifiers, a request for corresponding metadata. For example, control circuitry 204 may communicate with a remote server 315 or information source 330. At 820, control circuitry 204 continues process 525A by receiving, in response to the request for the corresponding metadata, a corresponding data structure associated with the corresponding metadata.

FIG. 9 depicts an illustrative flowchart of a process for retrieving metadata about media assets in a source user's viewing history, in accordance with some embodiments of the disclosure. Process 535A expands 535 of FIG. 5. At 905, control circuitry 204 continues from, for example, 530 of FIG. 5 by calculating, for each of the plurality of media assets, an amount of words of the plurality of words that match a corresponding media asset. At 910, control circuitry 204 continues process 535A by determining the media asset that the first user is describing, based on the calculated amount of words for each corresponding media asset.

FIG. 10 depicts an illustrative flowchart of a process for determining a segment of a media asset being described by a source user in a user conversation, in accordance with some embodiments of the disclosure. Process 545A expands 545 of FIG. 5. At 1005, control circuitry 204 compares text of each metadata entry of the plurality of metadata entries with each of the plurality of words. At 1010, process 545A continues, where control circuitry 204 identifies a metadata entry with a largest amount of words matching the plurality of words. Control circuitry 204 continues process 545A at 1015 by selecting the segment corresponding to the metadata entry with the largest amount of words matching the plurality of words.

FIG. 11 depicts an illustrative flowchart of a process for generating, for display to a target user, an indication of a segment of a media asset being described by a source user in a user conversation, in accordance with some embodiments of the disclosure. Process 570A expands 570 of FIG. 5. At 1105, control circuitry 204 identifies an electronic device associated with the second user. For example, the control circuitry 204 may contact a remote server that provides services to a target user 110 to determine which devices are in use by the target user 110, e.g., by determining which devices are actively communicating with the remote server in association with the target user 110. The control circuitry 204 continues process 570A at 1110 by generating for display the indication of the segment on the electronic device. For example, the control circuitry 204 may generate a link to be displayed on a display device in use by the target user 110.

The above-described embodiments of the present disclosure are presented for purposes of illustration and not of limitation, and the present disclosure is limited only by the claims that follow. Furthermore, it should be noted that features and limitations described in any one embodiment may be applied to any other embodiments herein, and flowcharts or examples relating to any one embodiment may be combined with any other embodiments in a suitable manner, done in different orders, or done in parallel. Furthermore, it should be noted that while a first step may be based on and/or in response to a second step, such a relationship does not preclude additional steps occurring between the first and second steps. In addition, the systems and methods described herein may be performed in real time. It should also be noted the systems and/or methods described above may be applied to, or used in accordance with, other systems and/or methods.

What is claimed is:

1. A method comprising:

detecting, at a user device, a plurality of words communicated between a first user and a second user;

determining, based on comparing the plurality of words with a plurality of keywords indicating that media content is being described, that the first user is describing a media content;

retrieving metadata for each of a plurality of media assets that the first user previously consumed at least in part;

comparing the metadata of each media asset in the plurality of media assets that the first user has previously consumed at least in part with the plurality of words;

determining, based on comparing the metadata of each media asset in the plurality of media assets that the first user has previously consumed at least in part with the plurality of words, a media asset that the first user is describing; and generating, for display at a display device, an indication of the media asset.

2. The method of claim 1, wherein the media asset relates to an event and wherein the indication comprises information related to the event.

3. The method of claim 1 further comprising:

retrieving metadata for each of a plurality of segments of the media asset; and determining, based on the metadata for each of the plurality of segments and the plurality of words, a segment of the media asset that the first user is describing;

wherein the indication comprises the segment.

4. The method of claim 1, wherein the user device is connected to a wireless network, and wherein the display device is connected to the wireless network.

5. The method of claim 1, wherein the indication of the media asset is automatically displayed at the display device.

6. The method of claim 1, further comprising:

generating, at the user device or the display device, a prompt related to confirming the media asset; and receiving an input from at least one of the first user or the second user confirming that the plurality of words communicated between the first user and the second user describe the media content.

7. The method of claim 1, wherein comparing the plurality of words with the plurality of keywords comprises:

selecting a first word of the plurality of words;

determining, based on comparing the first word of the plurality of words with each keyword of the plurality of keywords, whether the first word matches any of the plurality of keywords; and based on determining that the first word matches a keyword from the plurality of keywords, updating a word matching score.

8. The method of claim 7, wherein determining, based on comparing the plurality of words with the plurality of keywords, that the first user is describing the media content comprises:

determining whether the word matching score is greater than a threshold value; and based on determining that the word matching score is greater than the threshold value, determining that the first user is describing the media content.

9. The method of claim 7, wherein updating the word matching score comprises:

retrieving a weight associated with the keyword; and updating the word matching score with the weight associated with the keyword.

10. The method of claim 1, wherein determining, based on comparing the metadata of each media asset in the plurality of media assets that the first user has previously consumed at least in part with the plurality of words, the media asset that the first user is describing comprises:

determining, for each of the plurality of media assets, an amount of words of the plurality of words that match a corresponding media asset; and determining the media asset that the first user is describing based on the determined amount of words for each corresponding media asset.

11. A system comprising:

communication circuitry; and control circuitry configured to:

detect, at a user device, a plurality of words communicated between a first user and a second user;

determine, based on comparing the plurality of words with a plurality of keywords indicating that media content is being described, that the first user is describing a media content;

retrieve metadata for each of a plurality of media assets that the first user previously consumed at least in part;

compare the metadata of each media asset in the plurality of media assets that the first user has previously consumed at least in part with the plurality of words;

determine, based on comparing the metadata of each media asset in the plurality of media assets that the first user has previously consumed at least in part with the plurality of words, a media asset that the first user is describing; and generate, for display at a display device, an indication of the media asset.

12. The system of claim 11, wherein the media asset relates to an event and wherein the indication comprises information related to the event.

13. The system of claim 11, wherein the control circuitry is further configured to:

retrieve metadata for each of a plurality of segments of the media asset; and determining, based on the metadata for each of the plurality of segments and the plurality of words, a segment of the media asset that the first user is describing;

wherein the indication comprises the segment.

14. The system of claim 11, wherein the user device is connected to a wireless network, and wherein the display device is connected to the wireless network.

15. The system of claim 11, wherein the indication of the media asset is automatically displayed at the display device.

16. The system of claim 11, wherein the control circuitry is further configured to:

generate, at the user device or the display device, a prompt related to confirming the media asset; and receive an input from at least one of the first user or the second user confirming that the plurality of words communicated between the first user and the second user describe the media content.

17. The system of claim 11, wherein the control circuitry is configured, when comparing the plurality of words with the plurality of keywords, to:

select a first word of the plurality of words;

determine, based on comparing the first word of the plurality of words with each keyword of the plurality of keywords, whether the first word matches any of the plurality of keywords; and based on determining that the first word matches a keyword from the plurality of keywords, update a word matching score.

18. The system of claim 17, wherein the control circuitry is configured, when determining, based on comparing the plurality of words with the plurality of keywords, that the first user is describing the media content, to:

determine whether the word matching score is greater than a threshold value; and based on determining that the word matching score is greater than the threshold value, determine that the first user is describing the media content.

19. The system of claim 17, wherein the control circuitry is configured, when updating the word matching score, to:

retrieve a weight associated with the keyword; and update the word matching score with the weight associated with the keyword.

20. The system of claim 11, wherein the control circuitry is configured, when determining, based on comparing the metadata of each media asset in the plurality of media assets that the first user has previously consumed at least in part with the plurality of words, the media asset that the first user is describing, to:

determine, for each of the plurality of media assets, an amount of words of the plurality of words that match a corresponding media asset; and determine the media asset that the first user is describing based on the determined amount of words for each corresponding media asset.

\* \* \* \* \*